April 29, 1969
H. A. THOMAS
3,440,775
CONTROLLED REMOVAL OF COATINGS FROM DISCRETE
AREAS OF PHOTOGRAPHIC FILM
Filed Jan. 10, 1966
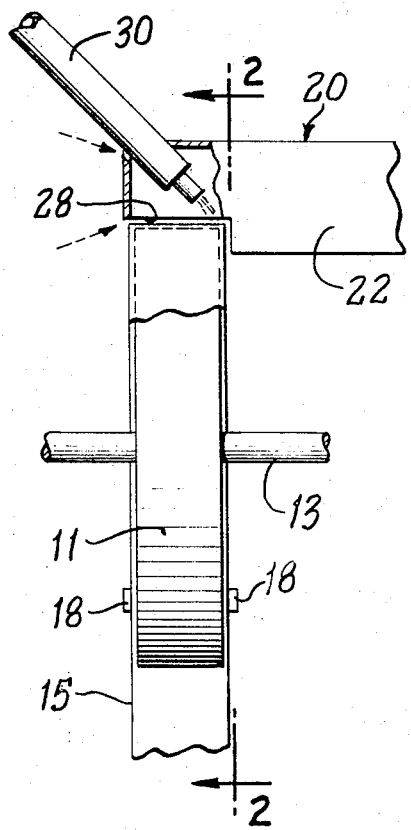
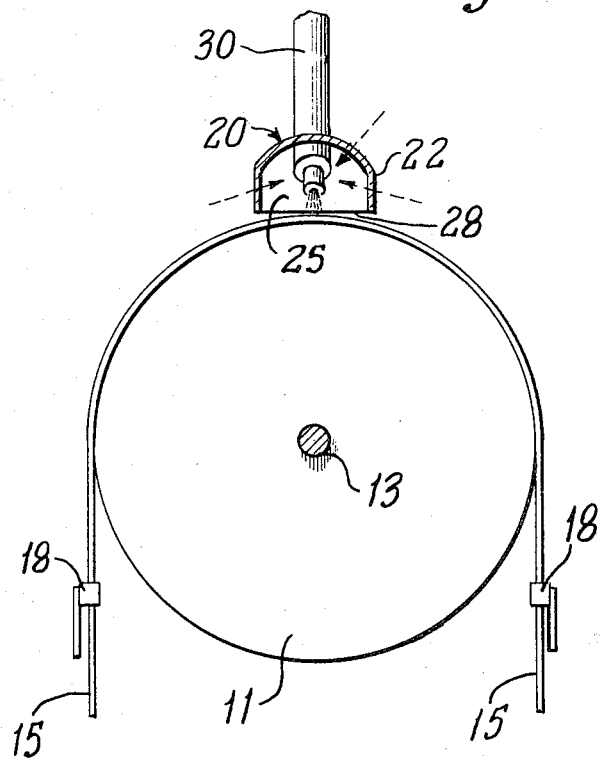
INVENTOR
HUDSON A. THOMAS

United States Patent Office 3,440,775
Patented Apr. 29, 1969

3,440,775
CONTROLLED REMOVAL OF COATINGS FROM DISCRETE AREAS OF PHOTOGRAPHIC FILM
Hudson A. Thomas, Johnson City, N.Y., assignor to GAF Corporation, a corporation of Delaware
Filed Jan. 10, 1966, Ser. No. 519,663
Int. Cl. B24b *1/00;* B24c *1/00, 3/00*
U.S. Cl. 51—319
2 Claims

ABSTRACT OF THE DISCLOSURE

Removal of a coating from a longitudinal strip of a web by passing the latter with the portion bearing the coating to be removed adjacent a gas blast containing abrasive particles, and removing the gaseous suspension by vacuum means from the abraded web area.

---

This invention is a novel apparatus for removing a strip of coating from a precoated web. The invention is of particular use in preparing photographic film for the application of a magnetizable sound-recording stripe thereto.

In the art of motion pictures, technological advancements have made it feasible to provide sound recording by means of a magnetizable stripe placed on the motion picture film. In this way, amateur movie makers and others may record the sound at the same time the picture is being taken, or may "dub in" suitable sound later, thus utilizing the flexibility of magnetic recording to provide sound movies.

Commonly, motion picture films have a back coating known as an antihalation layer placed on the opposite side of the support from that of the sensitized layer. The back coating, generally referred to as CBC, is necessary to control the halation caused by reflection from the film web, and also to provide light protection to the light-sensitive layer in the roll, so that it can be loaded into the exposing equipment in light. This coating generally consists of carbon black, or a dye, incorporated in a suitable gelatin or resin binder or vehicle and is removed in the film processing solution. Since the back coating is removed in processing, it is therefore necessary to first remove the back coating precisely only from the area on which the magnetic stripe will be coated in order that the magnetic stripe can be coated directly on the web.

In order that the magnetic sound stripe on the film should not interfere with the pictures taken or projected, it must be placed at the edge of the film outside of conventional sprocket holes. The removal of a small area of CBC coating from the film in order to provide a clearance for the magnetic stripe in the place of the removed coating is difficult and has presented problems in the art. The dimensions of the film are rather small, thus increasing the difficulty of removing a narrow strip of coating without disturbing the CBC layer on the remainder of the film.

It is the primary object of this invention to provide a novel method for precisely removing a predetermined strip of the back coating on the edge of motion picture film for subsequent coating with a stripe of magnetizable material.

Presently used methods for coating removal involve manually or mechanically plowing or scraping off the coating with a single-edged cutter or multiple edged rotary cutter or abrading away the coating by a manual or mechanical rubbing action. Plowing and scraping or abrading with mechanically held abrasives is unsatisfactory for continuous coating removal due to limited cutter and abrader life, fouling of the cutter or abrader and to difficulty in controlling the depth of removal as the thickness of the photographic film varies. Also, in such procedures there is a problem in handling the waste grit.

While it also has been proposed, for example, in U.S. Patent 3,050,758 and 3,193,410 that treatments with water or other solvents or coating softening agents may be used to remove a discrete coating area from photographic film, such processes generally provide only limited operating speeds except when removing temporary coatings formulated specifically for wet removal. Also, such procedures generally have definite problems associated with the handling of the liquid treating agent and the wet film, and often fairly elaborate apparatus must be employed to overcome these problems.

In this invention method is provided for grit blasting of the web coating and also, preferably, immediate removal from the treating area of the waste grit by suction. The abrasive grit may be any of the hard particulate materials available for such purposes, such as silicon carbide, aluminium oxides, etc., in a size range of about 10 to 50 $\mu$. The system is dry, the grit being suspended in a gas, usually air, carbon dioxide, etc.

The system of this invention provides a number of advantages not heretofore found in systems for coating removal from a portion of a web. Grit blasting provides a process for coating removal which is insensitive to minor variations in film thickness. The amount of coating removed can be controlled by varying the operating conditions, and can be performed continuously at high operating speeds. The use of grit blasting provides simultaneous removal of the coating and formation of a fine tooth on the surface of the film base. The type of abrasive powder used and the rate of abrasive flow relative to the rate of film movement determine the degree of coating removal and of filmbase etching.

Contrary to expectation, it was found that substantially less than 100% coating removal was required to permit adequate adhesion of a magnetic recording stripe to the underlying filmbase. The residual coating is apparently penetrated in many spots by abrasive particles and is sufficiently discontinuous to permit penetration and adhesion of the magnetic lacquer.

In this invention grit blasting may be accomplished using commercially available equipment. The blast may be produced using, for example, grit blasting apparatus originally developed for the practice of dentistry. Such apparatus is described in many patents including U.S. 2,696,049. In this invention, a grit blast nozzle is held by a proper fixture or clamp such that the discharge is at an acute angle; preferably the blast is intentionally angled about 45° with the film plane and directed at the film edge. Surrounding the abrasive directing nozzle is a vacuum chamber which is connected to a suitable vacuum system. Air flowing toward the vacuum chamber surrounding and in line with the discharge nozzle traps the abrasive powder particles upon rebound from the film surface and carries them away from the working area so that they will not settle upon the film and remain there as a contaminant. The shape and position of the nozzle are the primary determinants of the location and extent of coating removal, but the strength of the vacuum and the pressure of the blast also will affect the direction of the grit blast. Elevated gas pressures for entrainment of the grit in the gas may be achieved by well-known means, for example, by the use of air compressors, pressurized canisters of $CO_2$, etc. The moving strand of unexposed photographic motion picture film or other ribbon of material to be treated as conducted past the grit nozzle on a suitable support, for example, a rotating drum.

The invention will be better understood by reference

FIGURE 1 is a side view of apparatus according to this invention; and

FIGURE 2 is a cross-sectional view of the apparatus along the line 2—2 of FIGURE 1.

The apparatus provides a drum 11 mounted for rotation about a suitable axle 13 which is connected to a suitable source of rotary power, not shown. Over this drum 11 moves film 15; as shown, it is preferable for the drum 11 to be slightly narrower in width than the film or for the film 15 at least to overhang the drum at the portion to be abraded. Suitable guides 18 are provided to hold the film in alignment during its travel.

The vacuum attachment, indicated generally as 20 in the drawings, advantageously comprises a metal hood 22 having an open end 25 and an open bottom portion 28. Preferably the hood is cut to embrace the top and side of the film 15 as it passes. The vacuum attachment 20 preferably also provides for support of the grit blast nozzle 30. As can be seen, simultaneous operation of the nozzle 30 and the vacuum attachment 20 provides for air flow generally along paths shown as dashed arrows in FIGURE 1.

The arrangement shown in the drawings has proven successful in continuous-run types of operation up to film speeds of 200 feet per minute. The percentage of CBC removal has been varied and controlled by varying film speed, abrasive powder flow, and the type of abrasive powders used.

Thus, the method of this invention provides for the partial or complete removal of coatings from selected areas of photographic film by grit blasting. Removal of part or all of a coating or coatings may be desirable to provide increased transmission of light, etc., or to expose a substratum or the filmbase itself for examination or for a further process. Grit blasting according to this invention can effect a rapid but controllable reduction in opacity of specific areas of a photographic negative or positive. As shown, grit blasting effects a rapid and controllable removal of coating to expose discrete areas of the filmbase itself to a subsequent process. Examples of processes requiring such coating removal include graphic data recording or application of a strip or stripe of magnetic recording material, processes in which survival of the data or the stripe through subsequent chemical processing and/or repeated projections require that they be affixed to the film base rather than to a removeable black coating or to the relatively mobile image-forming or protective coating on photographic film.

What is claimed is:
1. A method of removing coating from a longitudinal strip portion of a web which comprises passing said web with only said strip portion bearing the coating to be removed in close proximity to a blast of gas having abrasive particles suspended therein and removing said particles by vacuum means from said web.
2. The method of claim 1 where the blast is directed at an angle of about 45° to the web.

References Cited

UNITED STATES PATENTS

| | | | |
|---|---|---|---|
| 1,125,232 | 1/1915 | Weyl | 51—319 |
| 2,037,047 | 4/1936 | Rosenberger | 51—8 |
| 2,092,083 | 9/1937 | Ogle et al. | 51—15 X |
| 2,448,316 | 8/1948 | Lesavoy | 51—319 X |
| 2,455,514 | 12/1948 | Mead | 51—8 |
| 2,993,309 | 7/1961 | Barnes et al. | 51—14 |
| 3,179,025 | 4/1965 | Schur | 51—8 X |

LESTER M. SWINGLE, *Primary Examiner.*

U.S. Cl. X.R.

51—15